(12) United States Patent
Anand et al.

(10) Patent No.: US 12,406,012 B2
(45) Date of Patent: Sep. 2, 2025

(54) PROACTIVE CONTEXTUAL AND PERSONALIZED SEARCH QUERY IDENTIFICATION

(71) Applicant: Microsoft Technology Licensing, LLC, Redmond, WA (US)

(72) Inventors: Rashi Anand, Hyderabad (IN); Beethika Tripathi, Lucknow (IN); Daraksha Parveen, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 289 days.

(21) Appl. No.: 17/475,542

(22) Filed: Sep. 15, 2021

(65) Prior Publication Data
US 2023/0079148 A1    Mar. 16, 2023

(51) Int. Cl.
*G06F 16/9535* (2019.01)
*G06F 16/9538* (2019.01)
*G06F 40/279* (2020.01)
*G06F 40/30* (2020.01)
*G10L 15/18* (2013.01)
*G10L 15/22* (2006.01)
*H04L 65/40* (2022.01)

(52) U.S. Cl.
CPC ...... *G06F 16/9535* (2019.01); *G06F 16/9538* (2019.01); *G06F 40/279* (2020.01); *G06F 40/30* (2020.01); *G10L 15/1815* (2013.01); *G10L 15/22* (2013.01); *H04L 65/40* (2013.01)

(58) Field of Classification Search
None
See application file for complete search history.

(56) References Cited

U.S. PATENT DOCUMENTS

| 7,082,430 B1 | 7/2006 | Danielsen et al. |
| 8,594,845 B1 | 11/2013 | Gharpure |
| 8,606,743 B2 | 12/2013 | Li et al. |

(Continued)

OTHER PUBLICATIONS

Zamfirescu, et al., "Sea: Search Engine Agents", In Proceedings of the International Conference Beyond, 2000, 6 Pages.

(Continued)

*Primary Examiner* — Amresh Singh
(74) *Attorney, Agent, or Firm* — CALFEE, HALTER & GRISWOLD LLP

(57) ABSTRACT

A computing system obtains text that relates to an experience of a user and determines a search intent based upon the text and a context of the user, where the context is determined based upon activity history of the user in a plurality of applications. The computing system identifies potential keywords in the text and identifies a search domain in a plurality of search domains based upon the potential keywords. The computing system computes a confidence score for each of the potential keywords based upon the search domain, the context, and prior search queries of the user. The computing system identifies keywords from amongst the potential keywords based upon the confidence scores and executes a search over an index based upon the keywords, where the index indexes user content of the user and content of an enterprise. The computing system presents search results for the search to the user.

20 Claims, 9 Drawing Sheets

(56) References Cited

U.S. PATENT DOCUMENTS

| | | | |
|---|---|---|---|
| 9,082,403 B2* | 7/2015 | Ju | G10L 15/1822 |
| 10,289,639 B2 | 5/2019 | Goldstein et al. | |
| 10,289,961 B2 | 5/2019 | Lakshmanan et al. | |
| 2008/0275701 A1 | 11/2008 | Wu et al. | |
| 2012/0226760 A1 | 9/2012 | Lewis et al. | |
| 2016/0306798 A1 | 10/2016 | Guo et al. | |
| 2017/0103082 A1 | 4/2017 | Hawker et al. | |
| 2021/0279563 A1* | 9/2021 | Sgobba | G06N 3/044 |
| 2022/0343081 A1* | 10/2022 | Gnanasambandam | G16H 50/20 |

OTHER PUBLICATIONS

"International Search Report and Written Opinion Issued in PCT Application No. PCT/US22/039494", Mailed Date: Nov. 14, 2022, 13 Pages.

* cited by examiner

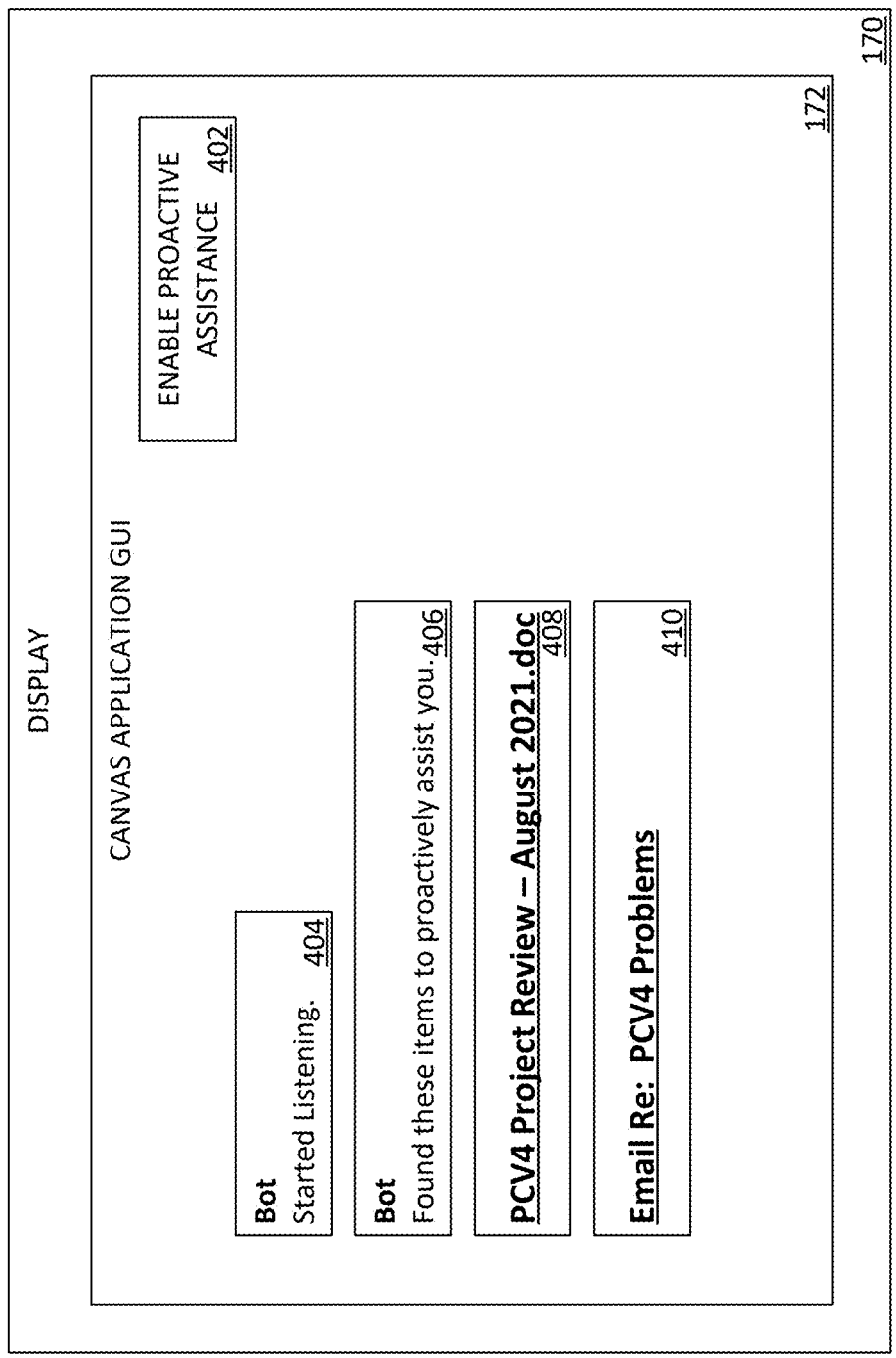
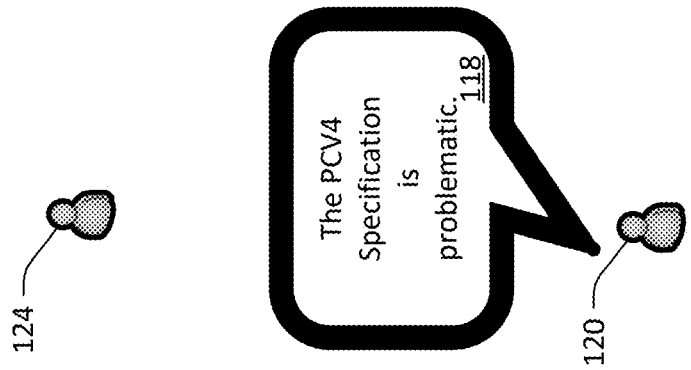
FIG. 4

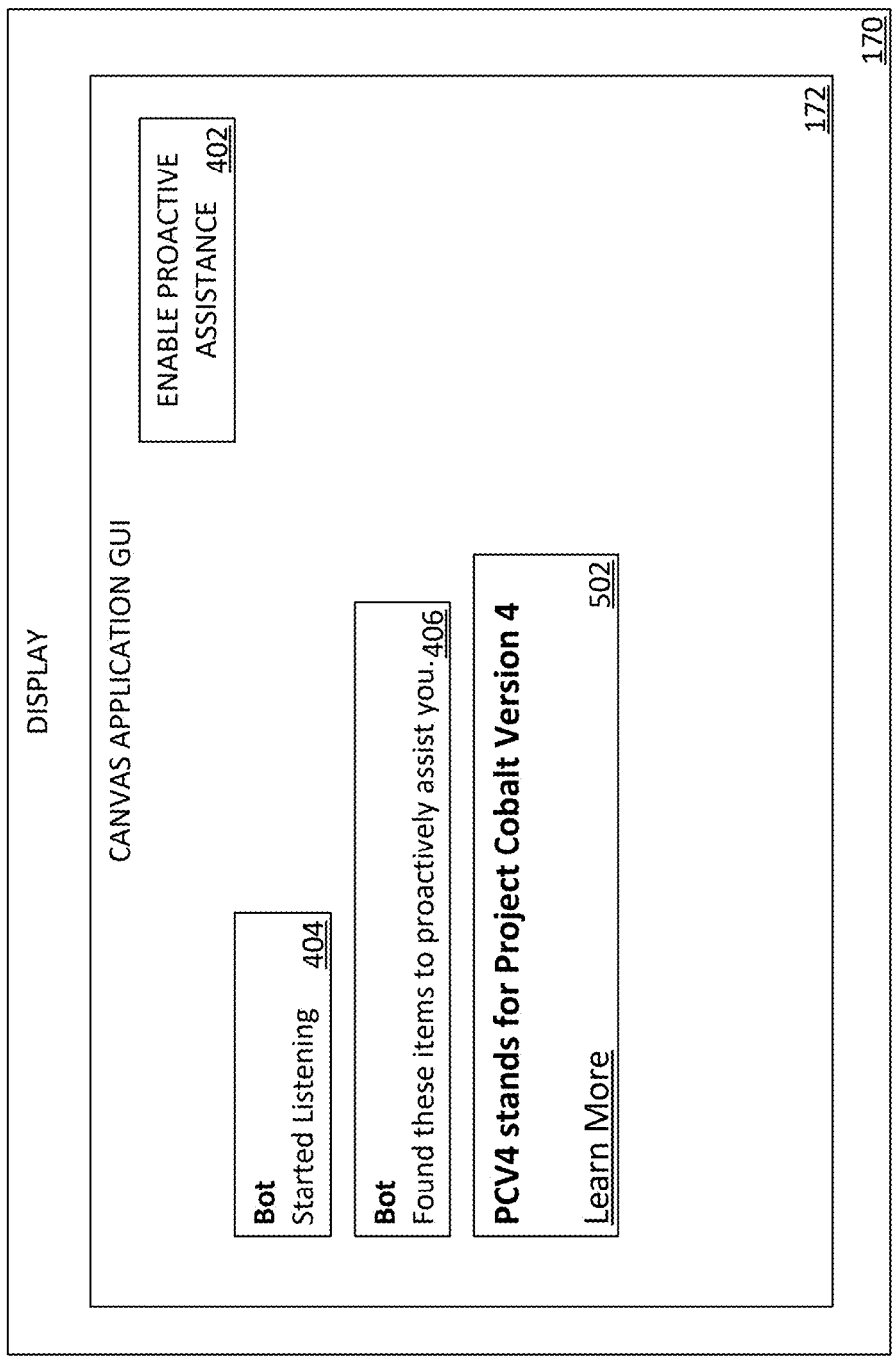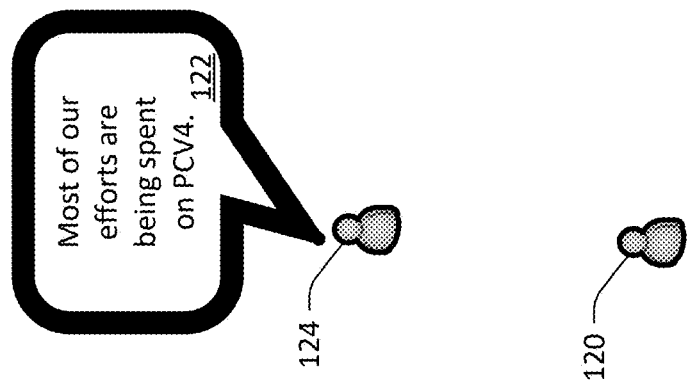
FIG. 5

PROACTIVE CONTEXTUAL AND PERSONALIZED SEARCH QUERY IDENTIFICATION

BACKGROUND

Conventional search applications require a user to explicitly set forth a search query and an intent to search. In an example, a computing device operated by a user: (1) receives the search query as keyboard input from the user, (2) receives a selection of a user interface element indicating that the user intends to transmit the search query to a search engine, and (3) transmits the search query to the search engine. In such an example, the selection of the user interface element serves as the intent to search. In another example, a virtual assistant executing on the computing device receives the search query as verbal input from the user and the virtual assistant causes the search query to be executed, where the search query is phrased as a question. In such an example, the presence of a question word (e.g., who, what, where, why, when, how) in the verbal input serves as the intent to search. In yet another example, the search query is phrased as a command to the virtual assistant, where the search query is preceded by a name of the virtual assistant. In such an example, the name of the virtual assistant serves as the intent to search.

SUMMARY

The following is a brief summary of subject matter that is described in greater detail herein. This summary is not intended to be limiting as to the scope of the claims.

Described herein are various technologies pertaining to proactive search, where the proactive search may be performed without receipt of an explicit indication from a user that the proactive search is to be performed. For example, a user and a second user verbally communicate in real-time over a network using a (real-time) meeting application. During a conversation over the meeting application, the user or the second user may verbally reference a topic. The technologies described herein identify that the topic is a search contender, retrieve relevant content relating to the topic, and present the relevant content to the user during the conversation, without requiring the user to formulate a search query. Thus, the technologies described herein anticipate content that is useful to the user and present the content to the user, without requiring the user to set forth an explicit intent to search.

In example operation, a computing system obtains computer-readable text that relates to an experience of a user. In an example, the experience of the user is a conversation that is occurring over a network in real-time between the user and a second user over a (real-time) meeting application. The computing system obtains the text by performing automatic speech recognition (ASR) in real-time on audio data that is indicative of spoken words uttered by the user or the second user, where the spoken words are uttered by the user to the second user or by the second user to the user. In another example, the experience of the user is reading a document displayed on a display of a computing device being operated by the user, and the computing system obtains the text from the document.

The computing system determines a search intent based upon the text and a context of the user. The context of the user is determined based upon activity history of the user in a plurality of computer-executable applications (e.g., a web browser, an email application, a file navigation application, etc.). In an example, the context of the user includes an identifier for a topic that the user is working on, the text includes a reference to the topic, and the search intent is to surface documents that the user is working on that relate to the topic. In another example, the text includes a reference to a topic, but the context of the user does not include an identifier for the topic, and the search intent is to surface information that explains the topic to the user. Upon determining the search intent, the computing system identifies one or more potential keywords in the text using a natural language processing (NLP) algorithm. In an example, the computing system identifies the one or more potential keywords by assigning part of speech tags to words in the text. The computing system selects certain words as the potential keywords based upon the part of speech tags.

The computing system attempts to map the one or more potential keywords to a search domain (also referred to as a keyword category ontology) in a plurality of search domains (e.g., the computing system identifies the search domain in the plurality of search domains based upon the one or more potential keywords). In an example, the search domain includes a plurality of related terms and the computing system maps the one or more potential keywords to the search domain by matching the one or more potential keywords to one or more of the plurality of related terms. In another example, when the computing system fails to map the one or more potential keywords to the search domain, the computing system does not proceed with a proactive search. Upon mapping the one or more potential keywords to the search domain, the computing system computes confidence scores for each of the one or more potential keywords based upon the search domain, the context of the user, and prior search queries of the user. The computing system identifies one or more keywords for search from amongst the one or more potential keywords based upon the confidence scores. The computing system executes a search over an index based upon the one or more keywords, where the index indexes user content (e.g., documents) of the user and user-accessible content. In an example, the user content is content that has been accessed by the user and the user-accessible content is content of an enterprise to which the user belongs. The computing system transmits search results for the search to a computing device of the user, whereupon the computing device presents the search results to the user in real-time. In an example, the search results include a link to a document that was referenced in the conversation between the user and the second user, and the computing device presents the link on a display as the conversation between the user and the second user is occurring.

The above-described technologies present various advantages over conventional search technologies. First, the computing system described above enables searches to be performed on behalf of the user without requiring the user to explicitly think of, formulate, and type a search query. Thus, the computing system described above obviates the need for manual input of a search query. Second, as the computing system described above can perform proactive searches in real-time without receiving an explicit search indication from the user, the computing system can present search results to the user in a non-intrusive manner. For instance, if a second user references an acronym that is unfamiliar to the user during a conversation, the computing system can present a definition of the acronym to the user in real-time so that the user does not need to ask the second user for a meaning of the acronym during the conversation.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 illustrates an example graphical user interface (GUI) of a canvas application.

FIG. 5 illustrates another example GUI of a canvas application.

Figure 1:
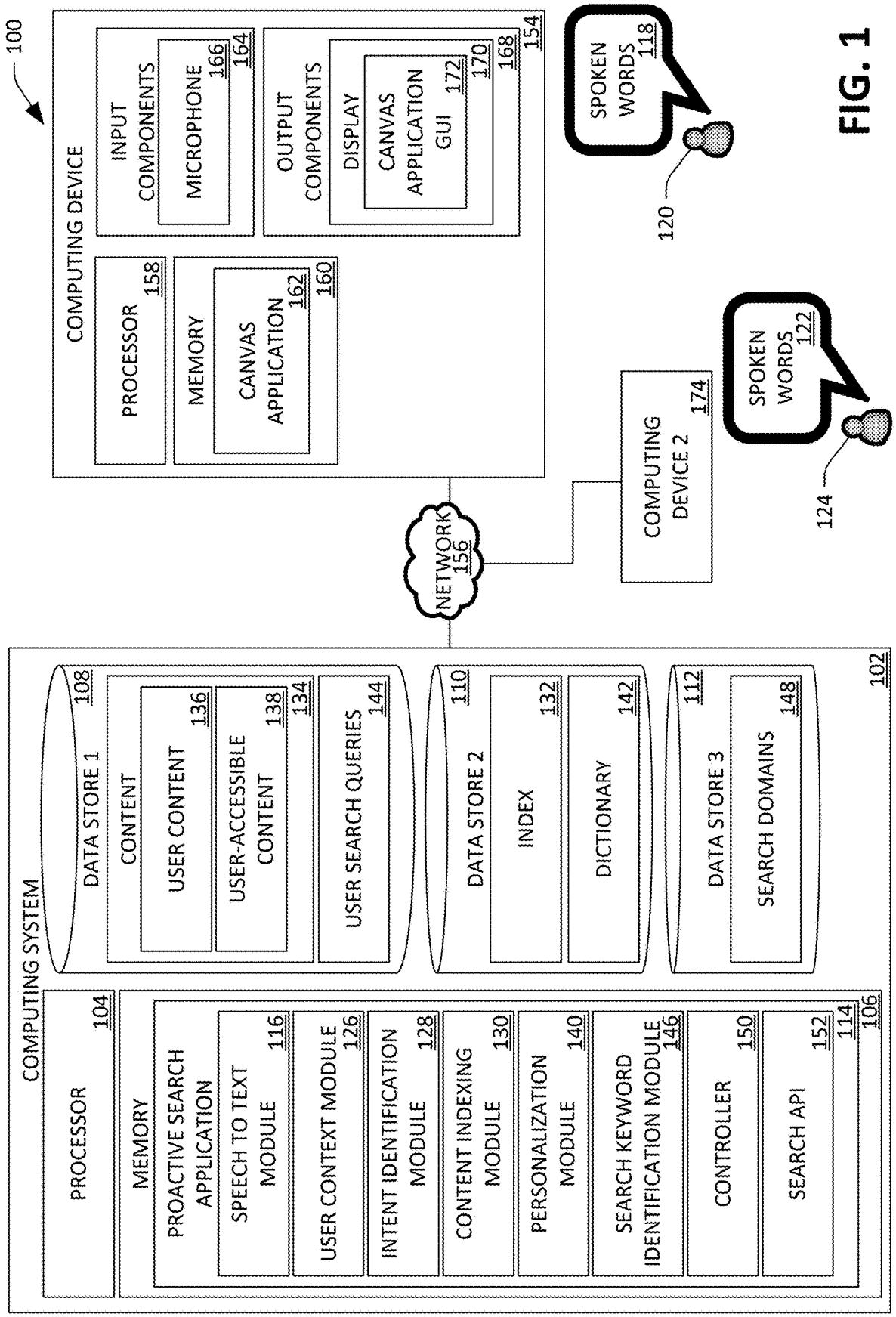
FIG. 1 is a functional block diagram of an example computing environment that facilitates proactive search.

Various technologies pertaining to proactive search are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As discussed above, conventional search technologies require a user to explicitly formulate a search query, either by requiring the user to input the search query via a keyboard or a touchscreen of a computing device or by requiring the user to verbally set forth the search query to a virtual assistant. This is cumbersome to a user and often impractical in cases where the user is in a (real-time) electronic meeting with a second user. In an example, the electronic meeting may require the full attention of the user and the user may not have time to manually set forth a search query. In another example, it may be inappropriate for the user to interrupt the electronic meeting to verbally set forth a search query.

To address these issues, a computing system is described herein that is configured to perform a proactive search on behalf of the user, without requiring the user to provide an explicit indication that he/she wishes to perform a search. In an example, the user may be in a conversation with a second user over a real-time meeting application and the second user may mention an acronym that is unfamiliar to the user. The computing system described herein is configured to (1) automatically identify that the acronym is unfamiliar to the user based upon a context of the user, (2) identify the acronym as a keyword for search, and (3) perform a search to obtain a definition of the acronym, all without requiring the user to set forth an explicit indication that he/she wishes to perform the search.

In example operation, a computing system obtains computer-readable text that relates to an experience of a user. In an example, the experience of the user is a verbal conversation that is occurring in real-time between the user and a second user over a real-time meeting application and the text is obtained by performing automatic speech recognition (ASR) in real-time on audio data that is indicative of spoken words uttered by the user or the second user, where the spoken words are uttered by the user to the second user during the conversation or by the second user to the user during the conversation. In another example, the experience of the user is reading a document displayed on a display, and the text is obtained from the document as the document is being displayed to the user. In yet another example, the experience of the user is a text conversation that is occurring in real-time between the user and the second user over a real-time messaging application (which may be a real-time meeting application), and the text is obtained from a message sent by the user to the second user during the text conversation or from a message sent by the second user to the user during the text conversation.

The computing system determines a search intent based upon the text and a context of the user. The context of the user is determined based upon activity history of the user in a plurality of computer-executable applications (e.g., a web browser, an email application, a file navigation application, etc.). In an example, the context of the user include an identifier for a topic that the user is working on, the text includes a reference to the topic, and the search intent is to surface documents that the user is working on that relate to the topic. In another example, the text includes a reference to a topic, but the context of the user does not include an identifier for the topic, and the search intent is to surface information that explains the topic to the user. Upon determining the search intent, the computing system identifies one or more potential keywords in the text using a natural language processing (NLP) algorithm. In an example, the computing system identifies the one or more potential keywords by assigning part of speech tags to words in the text and selecting certain words as the potential keywords based upon the part of speech tags.

The computing system attempts to map the one or more potential keywords to a search domain (also referred to as a keyword category ontology) in a plurality of search domains (e.g., the computing system identifies the search domain in the plurality of search domains based upon the one or more potential keywords). In an example, the search domain includes a plurality of related terms and the computing system maps the one or more potential keywords to the search domain by matching the one or more potential keywords to one or more of the plurality of related terms. In another example, when the computing system fails to map the one or more potential keywords to the search domain, the computing system does not proceed with a proactive search. Upon mapping the one or more potential keywords to the search domain, the computing system computes confidence scores for each of the one or more potential keywords based upon the search domain, the context of the user, and prior search queries of the user. The computing system identifies one or more keywords for search from amongst the one or more potential keywords based upon the confidence scores. The computing system executes a search over an index based upon the one or more keywords, where the index indexes user content (e.g., documents) of the user and user-accessible content. In an example, the user content is content that has been accessed by the user and the user-accessible content is content of an enterprise to which the user belongs. In a further example, the user may not have previously accessed some or all of the content of the enterprise. The computing system transmits search results for the search to a computing device of the user, whereupon the computing device presents the search results to the user in real-time. In an example, the search results include a link to a document that was referenced in the conversation between the user and the second user, and the computing device presents the link on a display as the conversation between the user and the second user is occurring.

The above-described technologies present various advantages over conventional search technologies. First, the computing system described above enables searches to be performed on behalf of the user without requiring the user to explicitly think of, formulate, and type a search query. Thus, the computing system described above obviates the need for manual input of a search query. Second, as the computing system described above can perform proactive searches in real-time without receiving an explicit search indication from the user, the computing system can present search results to the user in a non-intrusive manner. For instance, if a second user references an acronym that is unfamiliar to the user during a conversation, the computing system can present a definition of the acronym to the user in real-time so that the user does not need to ask the second user for a meaning of the acronym during the conversation.

With reference to FIG. 1, an example computing environment 100 that facilitates proactive search is illustrated. The computing environment 100 includes a computing system 102. According to embodiments, the computing system 102 is a server computing device. According to embodiments, the computing system 102 is a cloud-based computing platform. The computing system 102 includes a processor 104, memory 106, and a first data store 108. The computing system 102 may also include a second data store 110 and a third data store 112.

The memory 106 stores a proactive search application 114. As will be described in greater detail below, the proactive search application 114, when executed by the processor 104, is configured to, inter alia, perform proactive searches and present search results for the proactive searches to users. According to embodiments, some of the functionality of the proactive search application 114 is implemented using a bot that communicates with the users (explained in greater detail below).

The proactive search application 114 may include a speech to text module 116. The speech to text module 116 is configured to (1) receive audio data that is indicative of spoken words 118 that are uttered by a user 120 (or by other users) and (2) convert the audio data to computer-readable text. As such, it is to be understood that the speech to text module 116 may include an acoustic model (AM), a language model (LM), and a lexicon (not depicted in FIG. 1), where the speech to text module 116 utilizes the AM, the LM, and the lexicon to perform automatic speech recognition (ASR) in real-time on the audio data to convert the spoken words 118 to the computer-readable text. As will be described in greater detail below, the speech to text module 116 may also convert (second) spoken words 122 uttered by a second user 124 into (second) computer-readable text.

The proactive search application 114 includes a user context module 126. The user context module 126 is configured to determine a context of the user 120 based upon activity history of the user 120 in a plurality of computer-executable applications. In an example, the applications include a web browser, an email application, a word processing application, a real-time messaging application, a real-time meeting application, a word processing application, a spreadsheet application, a slideshow application, and/or a file navigation application. According to embodiments, the applications include Microsoft Edge®, Microsoft® Outlook, Microsoft® Word, Microsoft Teams®, Microsoft® Excel, Microsoft® PowerPoint, and/or Microsoft® SharePoint. In an example, the activity history of the user 120 includes a web browsing history of the user 120, emails sent to and sent by the user 120, real-time messages sent to and sent by the user 120, transcripts of meetings in which the user 120 participated, documents associated with (accessed by, modified by, created by) the user 120, spreadsheets associated with the user 120, slideshows associated with the user 120, and/or files opened by the user 120. According to embodiments, the activity history of the user 120 is limited to activities performed by the user 120 in the applications within a predefined period of time, that is, the activity history of the user 120 reflects activities performed by the user 120 within the period of time. In an example, the period of time is one week, one month, or one year. According to embodiments, the user context module 126 additionally determines the context of the user 120 based upon a role of the user 120 in an organization, such as a job title of the user 120 and/or job responsibilities of the user 120.

According to embodiments, the user context module 126 identifies one or more topics that are of interest to the user 120 based upon the activity history of the user 120, where the identifiers for the topics are the context of the user 120. According to embodiments, the user context module 126 identifies names of files and people that are of interest to the user 120. The user context module 126 may include one or more computer-implemented machine learning models (not shown in FIG. 1) that take the activity history of the user 120 as input and that output identifiers for topics that are of interest to the user 120. According to embodiments, the user context module 126 receives data indicative of the activity history of the user 120 in real-time or periodically (once an hour, once a day, etc.) and continually determines the context of the user 120 based upon the received data.

The proactive search application 114 further includes an intent identification module 128. The intent identification module 128 is configured to identify a search intent based upon (1) computer-readable text that is indicative of an experience of the user 120 and (2) the context determined by the user context module 126. In an example, the intent identification module 128 receives the text from the speech to text module 116. In another example, the intent identification module 128 receives the text from a document that is being displayed to the user 120. According to embodiments, the intent identification module 128 includes natural language processing (NLP) algorithms (not shown in FIG. 1) that take the text and the context as input and that output an indication of whether or not a search intent was intended. According to embodiments, the intent identification module 128 parses the text and assigns part of speech tags (e.g., noun, verb, etc.) to words in the text and determines the search intent based upon the part of speech tags.

It is to be understood that the search intent may vary based upon the context of the user 120. In a first example, the text references a first topic and the context of the user 120 indicates that the user 120 has worked on documents related to the first topic. Thus, in the first example, the search intent is to find documents related to the first topic that the user 120 has worked on. In a second example, the text references a second topic and the context of the user 120 indicates that the user 120 is not familiar with second topic. Thus, in the second example, the search intent is to find content that explain the second topic. The intent identification module 128 is further configured to prevent over-triggering of proactive searches (explained in greater detail below).

The proactive search application 114 further includes a content indexing module 130. The content indexing module 130 is configured to generate an index 132 (which may be stored in the second data store 110) that indexes content 134 (which may be stored in the first data store 108). The content 134 includes one or more of files (e.g., documents, spreadsheets, slideshows, etc.), emails, websites, and/or real-time message logs. The content 134 includes user content 136 of the user 120, where the user content 136 of the user 120 is content that has been accessed by, viewed by, created by, and/or modified by the user 120. The content 134 also includes user-accessible content 138, where the user-accessible content is content that is accessible by the user 120, but that may have not been accessed by, viewed by, created by, and/or modified by the user 120. According to embodiments, the user-accessible content 138 includes content of an organization (e.g., an enterprise) to which the user 120 belongs. Although not depicted in FIG. 1, the index 132 may also index content stored locally on the computing device 154 and/or content stored in locations other than the first data store 108. According to embodiments, the index 132 is stored in the first data store 108 (as opposed to the second data store 110). In an example, an entry in the index 132 for a document includes a storage location for the document and keywords that are associated with the document. The keywords may be based upon searches performed by a plurality of users for the document and/or words within the document.

The proactive search application 114 further includes a personalization module 140. The personalization module 140 is configured to generate a dictionary 142 (which may be stored in the second data store 110) based upon user search queries 144 (stored in the first data store 108) that have been previously submitted by the user 120. The user search queries 144 may include search queries submitted to a search engine, search queries that are executed over local storage associated with the user 120, and search queries that are executed over remote storage associated with the user 120. The dictionary 142 includes a list of keywords that are obtained from the user search queries 144. According to embodiments, the personalization module 140 utilizes a computer-implemented machine learning model (not shown in FIG. 1) that classifies groups of keywords in the dictionary 142 into groups of related keywords. It is contemplated that the personalization module 140 receives the user search queries 144 in real-time or periodically and that the personalization module 140 updates the dictionary 142 upon receiving the user search queries 144. According to embodiments, the personalization module 140 computes scores for each group of related keywords in the dictionary 142 (or scores for each keyword within each group of related keywords) based upon the context identified by the user context module 126 and/or a frequency at which the user 120 uses the keywords in the user search queries 144.

The proactive search application 114 further includes a search keyword identification module 146. As will be explained in greater detail below, the search keyword identification module 146 attempts to map a potential keyword in the computer-readable text to a search domain in a plurality of search domains 148 (which may be stored in the third data store 112). The plurality of search domains 148 may also be referred to as "keyword category ontologies." In an example, the search domain includes related terms and the search keyword identification module 146 maps the potential keyword to the search domain by searching the related terms in the search domain for the potential keyword. In an example involving an enterprise, the plurality of search domains 148 includes a first search domain that is predefined for and assigned to a first department within the enterprise and a second search domain that is predefined for and assigned to a second department within the enterprise. Upon mapping the potential keyword to the search domain, the search keyword identification module 146 computes a confidence score for the potential keyword based upon data from the search domain, the context of the user 120, and data from the dictionary 142.

The proactive search application 114 further includes a controller 150 and a search application programming interface (API) 152. The controller 150 is configured to interface with the search keyword identification module 146, the search API 152, and canvas applications (explained in greater detail below). The controller 150 takes the keyword (or keywords) identified by the search keyword identification module 146 as input and provides the keyword to the search API 152. The search API 152 executes a search over the index 132 based upon the keyword and returns search results for the search to the controller 150.

The computing environment 100 includes a computing device 154 that is operated by the user 120. In an example, the computing device 154 is a desktop computing device, a laptop computing device, a tablet computing device, an augmented reality computing device, a virtual reality computing device, a smartphone, a gaming console, or a wearable computing device. The computing device 154 is in communication with the computing system 102 by way of a network 156 (e.g., the Internet, intranet, etc.).

The computing device 154 includes a processor 158 and memory 160, where the memory 160 has a canvas application 162 loaded therein. The canvas application 162, when executed by the processor 158, is generally configured to (1) receive the search results from the controller 150 and (2) present the search results to the user 120. In an example, the canvas application 162 is a real-time meeting application, a real-time messaging application, a web browser, a word processing application, a spreadsheet application, or a slideshow application. The computing device 154 includes input components 164 that enable the user 120 to provide input to the computing device 154. The input components 164 include a microphone 166, where the microphone 166 is configured to receive the spoken words 118 of the user 120 as input. Although not depicted in FIG. 1, the input components 164 may also include a mouse, a keyboard, a trackpad, a scroll wheel, a touch screen, a camera, a video camera, etc.

The computing device 154 further includes output components 168 that are configured to output data to the user 120. The output components 168 include a display 170, whereupon graphical features may be presented thereon. According to embodiments, the display 170 is a touchscreen display. The display 170 displays a GUI 172 for the canvas application 162 (also referred to herein as "the canvas application GUI 172"). The canvas application GUI 172 displays search results to the user 120 that are received by the canvas application 162 from the controller 150. The output components 168 may also include a speaker (not shown in FIG. 1) that emits audible sounds.

The computing environment 100 may include a second computing device 174 that is operated by the second user 124. The second computing device 174 may include some or all of the components of the computing device 154 (e.g., a processor, a memory, a canvas application, a microphone, etc.). The second computing device 174 may be in communication with the computing system 102 and/or the computing device 154 by way of the network 156.

Figure 2:
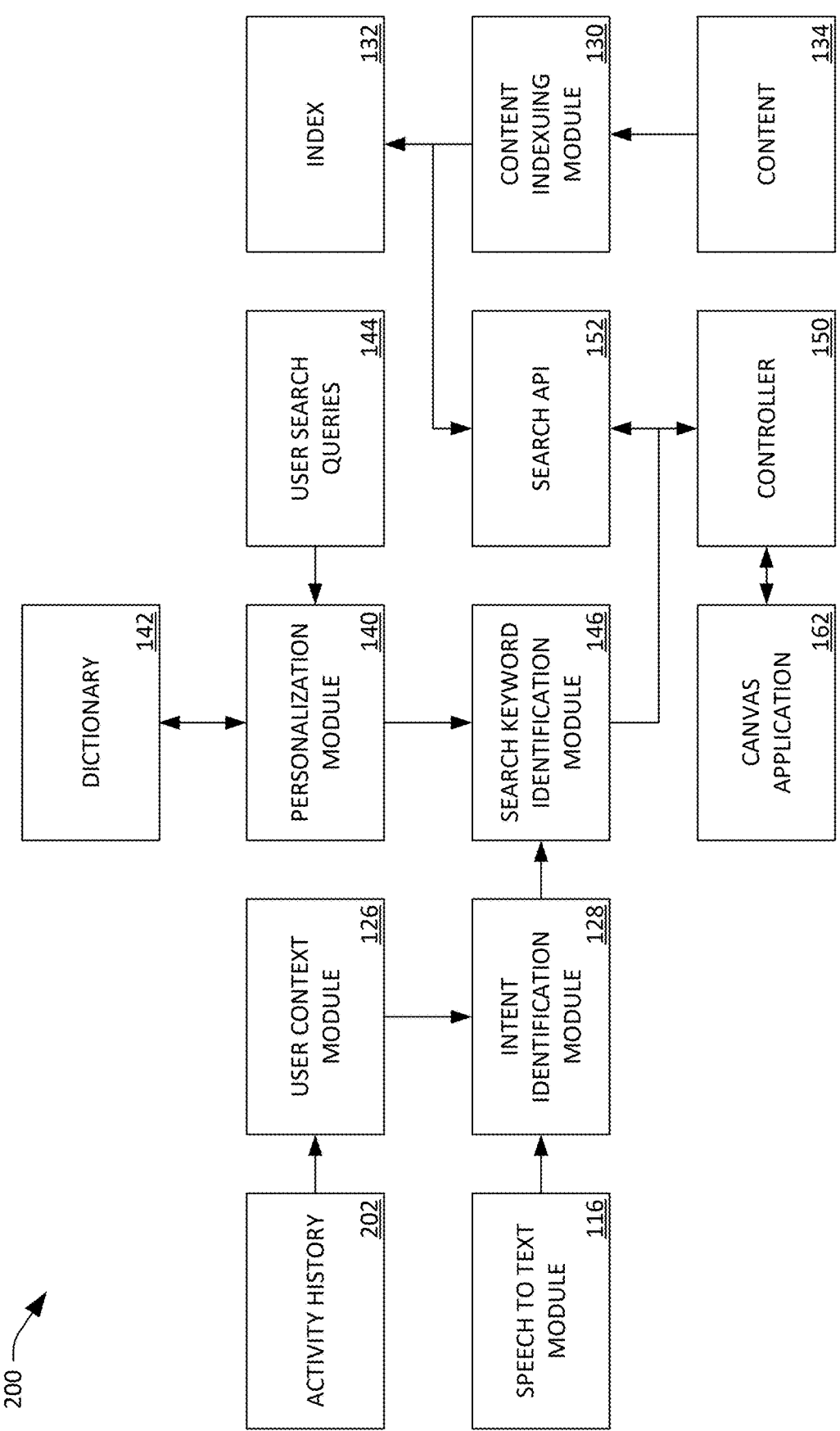
FIG. 2 illustrates an example flow of data in the computing environment depicted in FIG. 1.

With reference now to FIGS. 2, an example flow 200 of data in the computing environment 100 is illustrated. Referring collectively now to FIGS. 1 and 2, operation of the computing environment 100 is now set forth. It is contemplated that the content indexing module 130 generates the index 132 based activity history of a plurality of users (e.g., the first user 120, the second user 124, etc.) with respect to the content 134. It is also contemplated that the user context module 126 receives an activity history 202 (which may be stored in the first data store 108) of the user 120 and determines a context of the user 120 based thereon as described above. Furthermore, it is contemplated that the personalization module 140 receives the user search queries 144 and generates the dictionary 142 based thereon. Moreover, it is also contemplated that the proactive search application 114 has previously received an indication that the user 120 consents to proactive searches (e.g., the user has "opted-in" to proactive searches).

It is contemplated that the user 120 is undergoing an experience. In one example, the user 120 is having a conversation with the second user 124 over the network 156 using a (real-time) meeting application, where the meeting application enables the user 120 and the second user 124 to communicate in real-time via text, audio, and/or video. In another example, the user 120 is reading a document displayed on the display 170 within the canvas application GUI 172.

The proactive search application 114 obtains computer-readable text that relates to the experience of the user 120. In a first example, the user 120 is verbally communicating with the second user 124 over the network 156 using meeting application and the user 118 utters the spoken words 118. The microphone 166 of the computing device 154 receives the spoken words 118 and the computing device 154 transmits audio data that is indicative of the spoken words 118 to the proactive search application 114. The speech to text module 116 performs ASR on the audio data to obtain the computer-readable text.

In a second example, the user 120 is communicating with the second user 124 over the network 156 using the meeting application and the second user 124 utters the second spoken words 122. A microphone of the second computing device 174 receives the second spoken words 122 and the second computing device 174 transmits audio data that is indicative of the second spoken words 122 to the proactive search application 114. Alternatively, the microphone 166 of the computing device 154 receives the second spoken words 122 as the second spoken words 122 are emitted from a speaker of the computing device 154. The computing device 154 transmits the audio data that is indicative of the second spoken words 122 to the proactive search application 114. The speech to text module 116 performs ASR on the audio data that is indicative of the second spoken words 122 of the second user 124 to obtain the computer-readable text.

In a third example, the user 120 is reading a document or a webpage that is displayed on the display 170. The computing device 154 transmits the document/webpage to the proactive search application 114. The proactive search application 114 performs processing on the document/webpage to obtain the computer-readable text.

In a fourth example, the user 120 is communicating with the second user 124 over the network 156 using the meeting application, and the user 120 types and sends a message to the second user 124, whereupon the message appears in a message log of the meeting application (displayed to both the user 120 and the second user 124). The computing device 154 transmits the message to the proactive search application 114. The proactive search application 114 performs processing on the message to obtain the computer-readable text.

In a fifth example, the user 120 is communicating with the second user 124 over the network 156 using the meeting application, and the second user 124 types and sends a message to the user 120, whereupon the message appears in the message log of the meeting application (displayed to both the user 120 and the second user 124). The computing device 154 transmits the message to the proactive search application 114. The proactive search application 114 performs processing on the message to obtain the computer-readable text.

Upon obtaining the computer-readable text, the intent identification module 128 determines a search intent based upon the computer-readable text and a context of the user 120. According to some embodiments, the user context module 126 determines the context of the user 120 based upon the activity history 202 of the user 120 (which is stored in a data store, such as the first data store 108) prior to the proactive search application 114 obtaining the text. According to other embodiments, the user context module 126 determines the context of the user 120 based upon the activity history 202 of the user 120 responsive to the proactive search application 114 obtaining the text. In the event that the intent identification module 128 does not determine a search intent, the proactive search application 114 does not perform a proactive search based upon the text.

Upon determining the search intent, the proactive search application 114 identifies one or more potential keywords in the text using a natural language processing (NLP) algorithm. In an example, the proactive search application 114 performs a part of speech analysis on the text and assigns part of speech tags (e.g., noun, verb, etc.) to words in the text. The proactive search application 114 may also strip out certain words from the text (based upon the part of speech tags) that are not likely to be relevant for search purposes (e.g., articles, prepositions, etc.).

Figure 3:
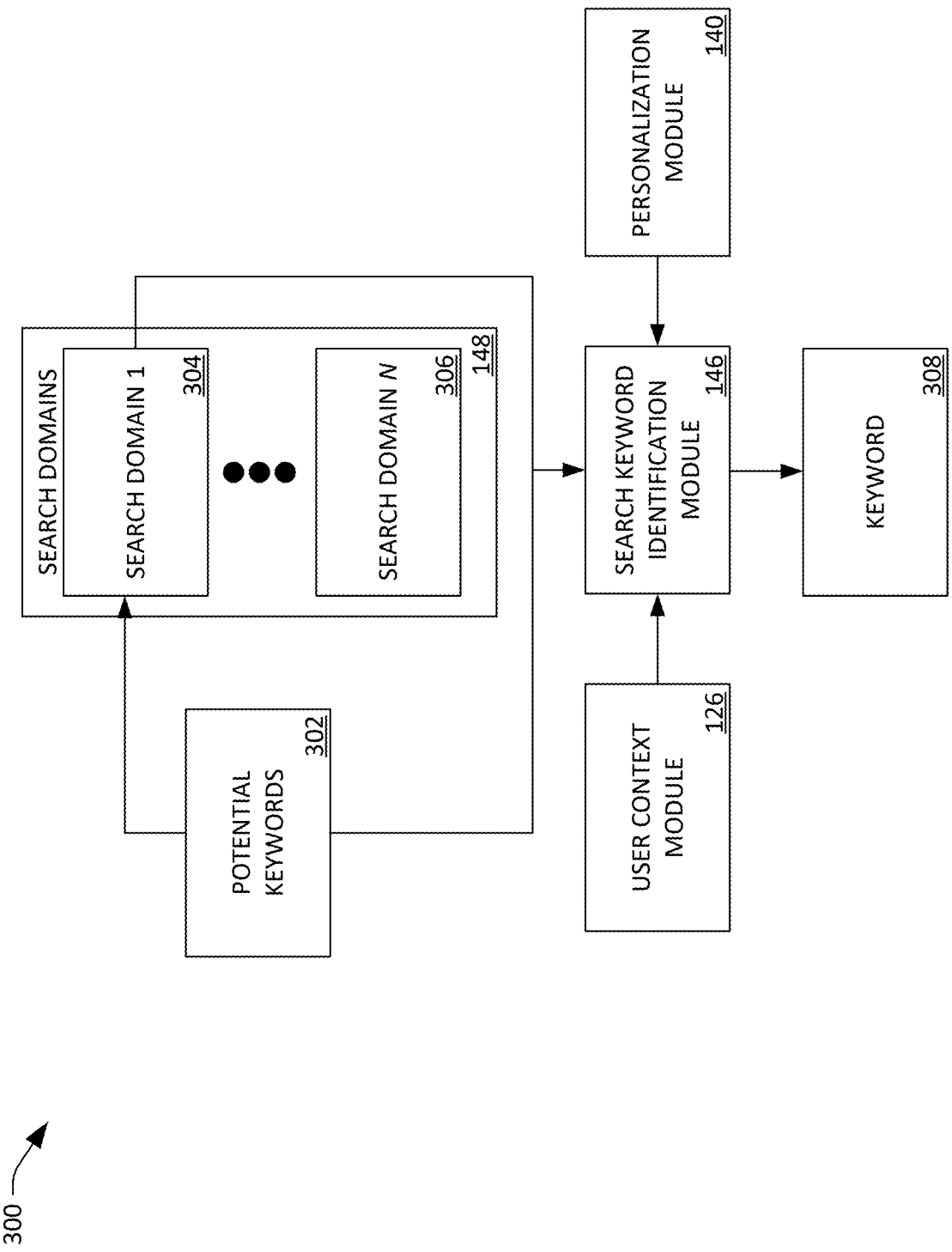
FIG. 3 illustrates another example flow of data in the computing environment depicted in FIG. 1.

With reference now to FIG. 3 in conjunction with FIGS. 1 and 2, the search keyword identification module 146 attempts to map the one or more potential keywords (referred to in FIG. 3 as "potential keywords 302") to a search domain in the plurality of search domains 148. Stated differently, the search keyword identification module 146 identifies the search domain in the plurality of search domains 148 based upon the potential keywords 302. As illustrated in FIG. 3, the plurality of search domains include a first search domain 304 and an Nth search domain 306, where N is a positive integer greater than one. In an example, the search keyword identification module 146 maps a potential keyword in the potential keywords 302 to the first search domain 304. In an example, the search keyword identification module 146 maps the potential keyword to the first search domain 304 by matching the one potential keyword to one or more of related terms included in the first search domain 304. In the event that the search keyword identification module 146 is not able to map the potential keywords 302 to a search domain in the plurality of search domains 148, the proactive search application 114 does not perform a search. Thus, mapping of the potential keywords 302 to the one of the plurality of search domains 148 serves as a check to ensure queries that are unlikely to surface relevant results are not executed.

Upon mapping the potential keywords 302 to the search domain in the plurality of search domains 148, the search keyword identification module 146 computes confidence scores for each of the potential keywords based upon the context of the user 120 (e.g., an identifier for a topic) determined by the user context module 126, the potential keywords 302, and keywords from the (prior) user search queries 144 included in the dictionary 142. According to embodiments where the dictionary 142 includes scores (based upon the context of the user 120 and/or the frequency at which the keywords in the dictionary 142 were used) computed by the personalization module 140 for groups of related keywords (or scores for individual keywords within the groups of related keywords), the confidence scores are additionally based upon the scores. The search keyword identification module 146 identifies a keyword 308 (or more than one keyword) for search based upon the confidence scores. In an example, the search keyword identification module 146 computes a first confidence score for a first potential keyword in the potential keywords 302 and a second confidence score for a second potential keyword in the potential keywords 302. In the example, the search keyword identification module 146 selects the first potential keyword as the keyword 308 for search based upon the first confidence score being greater than the second confidence score. Thus, the confidence scores are used to prioritize the potential keywords 302 in order of relevance.

Upon identifying the keyword 308, the search keyword identification module 146 provides the keyword 308 to the controller 150. The controller 150 provides the keyword 308 to the search API 152. The search API 152 executes a search of the index 132 based upon the keyword 308. The search API 152 provides the controller 150 with search results for the search. The controller 150 transmits the search results for the search to the canvas application 162, whereupon the canvas application 162 presents the search results to the user 120. It is contemplated that the search results may include links to the user content 136 and/or the user-accessible content 138 or the search results may include the user content 136 and/or the user-accessible content 138. In an example, the search results include a storage location of a document and an identifier for the document. The proactive search application 114 generates a link to the document based upon the storage location and causes the link to be presented on the display 170, where the document is presented to the user 120 upon the link being selected.

In an example where the user 120 and the second user 124 are having a verbal conversation in real-time over the network 156 using a (real-time) meeting application, it is contemplated that the canvas application 162 presents the search results to the user 120 as the conversation between the user 120 and the second user 124 is occurring. In an example where the user 120 is reading a document displayed on the display 170, it is contemplated that the canvas application 162 presents the search results to the user 120 in a pop-window presented concurrently with the document as the user 120. As such, proactive search application 114 described above ensures that the user 120 is presented with relevant content in real-time, without requiring the user 120 to set forth an explicit indication of an intent to search.

In an example, the search results include an identifier for a document that relates to the spoken words 118 uttered by the user 120 (or the second spoken words 122 uttered by the second user 124), and the canvas application 162 presents a link to the document within the canvas application GUI 172. When the link is selected by the user 120, the computing device 154 retrieves the document and presents the document on the display 170.

In another example, the search results include a definition of an acronym that is unfamiliar to the user 120 and that was referenced in the second spoken words 122 of the second user 124 (or that was found in a document being viewed by the user 120), and the canvas application 162 presents the definition within the canvas application GUI 172.

In yet another example, the search results include an email that relates to the spoken words 118 uttered by the user 120 (or the second spoken words 122 uttered by the second user 124) during a conversation over a (real-time) meeting application, and the canvas application 162 presents the email within the canvas application GUI 172. It is contemplated that the canvas application 162 presents the email within the canvas application GUI 172 as the conversation is occurring between the user 120 and the second user 124.

According to embodiments, the intent identification module 128 maintains a list of keywords that were used to obtain search results that have been presented to the user 120 during the conversation between the user 120 and the second user 124 (or a list of search results that have been presented to the user 120 while the user 120 is viewing a document). Prior to providing the keyword 302 to the controller 150, the proactive search application 114 may search the list for the keyword 302. In the event that the list already includes the keyword, the proactive search application 114 does not provide the keyword to the controller 150. In this manner, the proactive search application 114 prevents the user 120 from being inundated with repetitive search results.

It is understood that the search results for the search performed by the search API 150 may include identifiers for more than one document, email, etc. As such, the proactive search application 114 may select a subset of the search results for presentation to the user 120. According to embodiments, the proactive search application 114 ranks the search results based upon suitable criteria (e.g., the context of the user, the search intent) and selects a subset of the search results for presentation to the user 120 based upon the rankings.

Although the first data store 108, the second data store 110, and the third data store 112 are depicted in FIG. 1 as being part of the computing system 102, other possibilities are contemplated. According to embodiments, the first data store 108, the second data store 110, and the third data store 112 are part of separate computing devices.

Although the proactive search application 114 has been described above as including the speech to text module 116, the user context module 126, the intent identification module 128, the content indexing module 130, the personalization module 140, the search identification module 146, the controller 150, and the search API 152, other possibilities are contemplated. According to embodiments, some or all of the aforementioned modules may be included in different applications that run on different computing systems. Furthermore, according to embodiments, some of the functionality of the aforementioned modules may be implemented on the computing device 154. According to embodiments, the controller 150 and/or the search API 152 execute on a separate computing system.

According to embodiments, during a conversation between the user 120 and the second user 124 over a real-time meeting application, the proactive search application 114 accesses user permission settings of the user 120, where the user permission settings indicate whether or not search results obtained by the proactive search application 114 are to be additionally presented to other users in addition to the user 120. In an example, the user permission settings are stored as part of the user content 136 in the first data store 108. When the user permission settings indicate that the search results for the search are to be presented to other users, the proactive search application 114 causes the search results to be presented to the second user 124 on a display of the second computing device 174 during the conversation between the user 120 and the second user 124.

Turning now to FIG. 4, an example graphical user interface (GUI) 172 of the canvas application 162 is illustrated. In the example depicted in FIG. 4, the canvas application 162 is a (real-time) meeting application and the user 120 is having a (verbal) conversation over the network 156 with the second user 124 using the canvas application 162. In the example depicted in FIG. 4, it is contemplated that a proactive assistance button 402 has been selected by the user 120 prior to the conversation occurring. As such, the canvas application GUI 172 displays an indication 404 that proactive search is enabled.

In the example depicted in FIG. 4, the spoken words 118 uttered by the user 120 to the second user 124 during the conversation include "The PCV4 Specification is problematic." The microphone 166 receives the spoken words 118 and the computing device 154 transmits the spoken words to the proactive search application 114. Using the processes described above, the proactive search application 114 identifies keywords for search based upon the spoken words 118, where the keywords include the acronym "PCV4". The proactive search application 114 executes a search over the index 132 as described above based upon the keywords. The proactive search application 114 transmits an indication to the canvas application 162 that search results have been obtained. The canvas application 162 displays a message 406 that search results have been obtained. The canvas application 162 displays an identifier for a document 408 (e.g., "PCV4 Project Review—August 2021.doc") that is related to PCV4 and an identifier for an email 410 (e.g., "Email Re: PCV4 Problems") that is related to PCV4. The identifier for the document 408 and the identifier for the email 410 are selectable such that when the identifier for the document 408 or the identifier for the email 410 are selected, the document or the email, respectively, are presented within the canvas application GUI 172 (or a GUI of another application).

Referring now to FIG. 5, another example GUI 172 of the canvas application 162 is illustrated. In the example depicted in FIG. 5, the canvas application 162 is a (real-time) meeting application and the user 120 is having a verbal conversation with the second user 124 over the network 156 using the canvas application 162. In the example depicted in FIG. 5, it is contemplated that the proactive assistance button 402 has been selected by the user 120 prior to the conversation occurring. As such, canvas application GUI 172 displays the indication 404 that proactive search is enabled.

In the example depicted in FIG. 5, the spoken words 122 uttered by the second user 124 include "Most of our efforts are being on PCV4." A microphone of the second computing device 174 receives the second spoken words 122 and the second computing device 174 transmits the spoken words to the proactive search application 114. Alternatively, the microphone 166 of the computing device 154 receives the second spoken words 122 as a speaker of the computing device 154 emits the second spoken words 122 of the second user 124. Using the processes described above, the proactive search application 114 identifies keywords for search based upon the second spoken words 122, where the keywords include the acronym "PCV4". The proactive search application 114 also determines that the user 120 is not familiar with the acronym based upon the context of the user 120. The proactive search application 114 executes a search over the index 132 as described above based upon the keywords. The proactive search application 114 transmits an indication to the canvas application 162 that search results have been obtained. The canvas application 162 displays the message 406 that search results have been obtained. The GUI 172 displays a definition 502 of the PCV4 acronym ("PCV4 stands for Project Cobalt Version 4"). The GUI 172 also includes a selectable link ("Learn More") that, when selected by the user 120, causes information pertaining to PCV4 to be presented to the user 120 within the canvas application GUI 172 (or another GUI).

Figure 6:
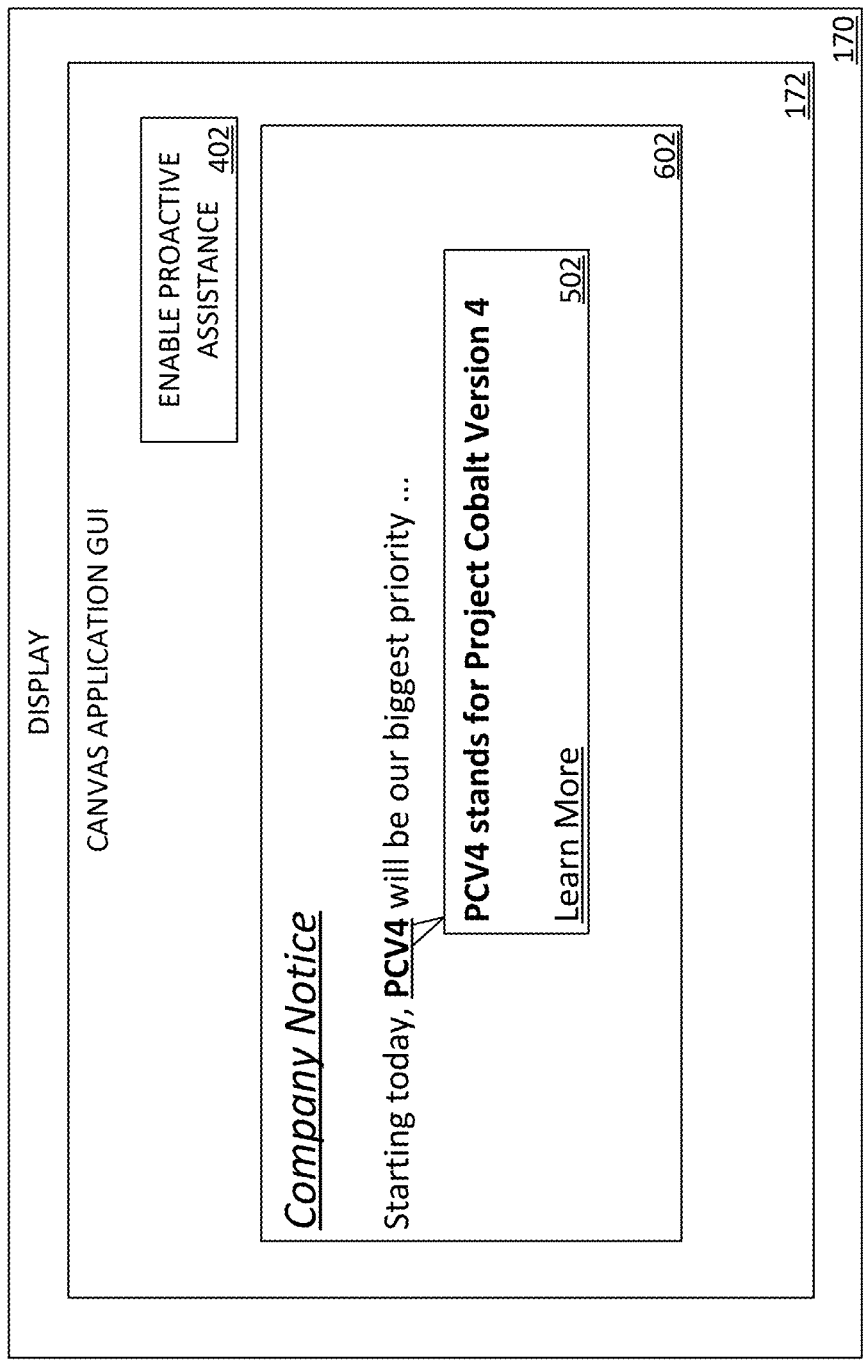
FIG. 6 illustrates yet another example GUI of a canvas application.

With reference now to FIG. 6, yet another example GUI 172 of the canvas application 162 is illustrated. In the example depicted in FIG. 6, the canvas application 162 is a web browser that is displaying a webpage 602 that the user 120 is reading. Alternatively, the canvas application 162 is a word processing application that is displaying a document to the user 120. In the example depicted in FIG. 6, it is contemplated that a proactive assistance button 402 has been selected by the user 120 prior to the webpage being displayed to the user 120.

Using the processes described above, the proactive search application 114 obtains the webpage 602 (or a portion thereof) and identifies keywords for search based upon the webpage 602, where the keywords include the acronym "PCV4". The proactive search application 114 also determines that the user 120 is not familiar with this acronym based upon the context of the user 120. The proactive search application 114 executes a search over the index 132 as described above based upon the keywords. The proactive search application 114 transmits search results for the search to the canvas application 162 and the canvas application 162 updates the GUI 172 to display the definition 502 of PCV4 ("PCV4 stands for Project Cobalt Version 4"). The proactive search application 114 can cause the definition 502 to be presented on the display 170, even when the user 120 has not explicitly selected "PCV4" on the webpage (e.g., the user 120 may not have clicked or hovered over PCV4 on the webpage 602). The GUI 172 also includes a selectable link ("Learn More") that, when selected by the user 120, causes information pertaining to PCV4 to be presented to the user 120.

Figure 7:
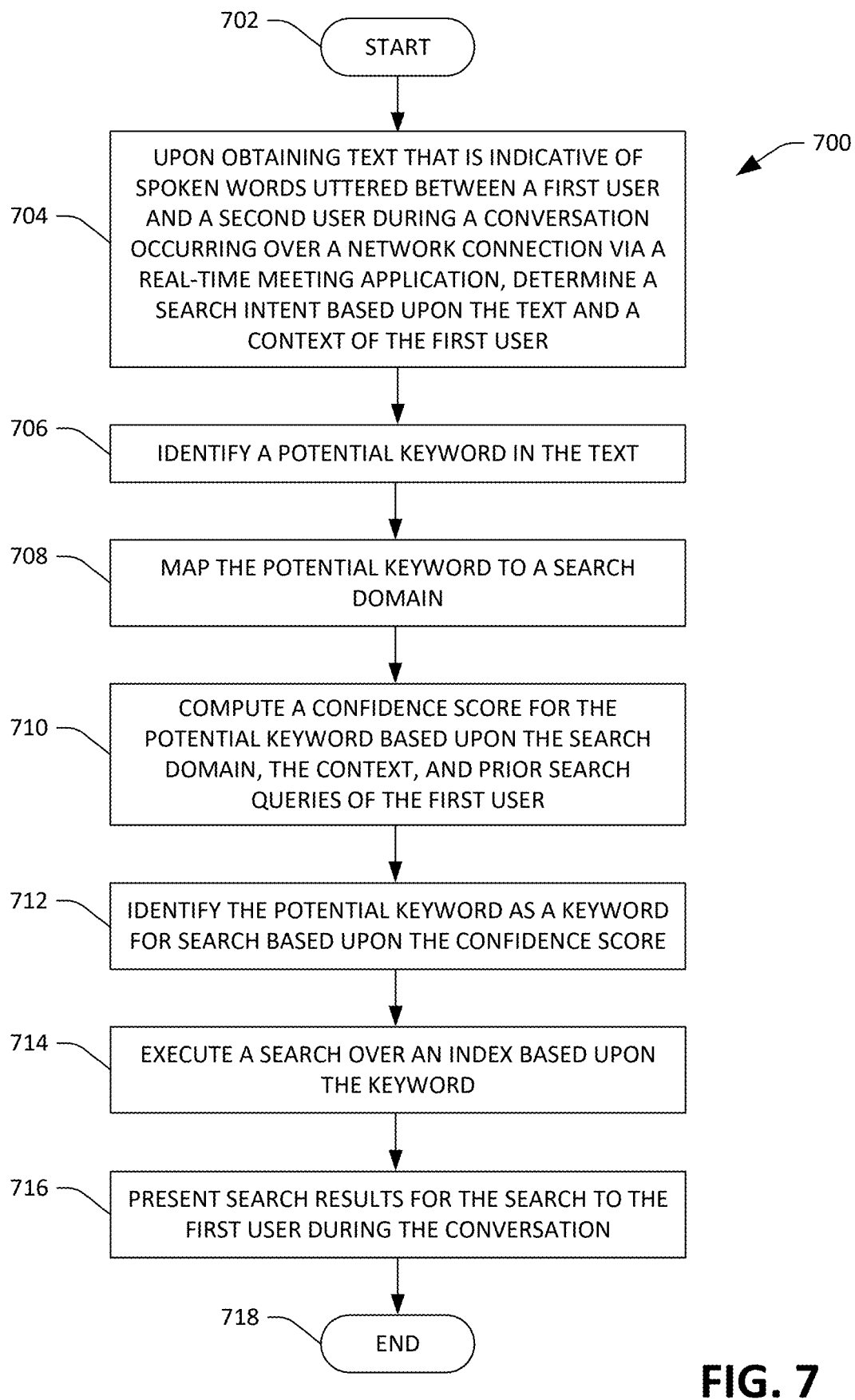
FIG. 7 is a flow diagram that illustrates an example methodology performed by a computing system that facilitates proactive search.
Figure 8:
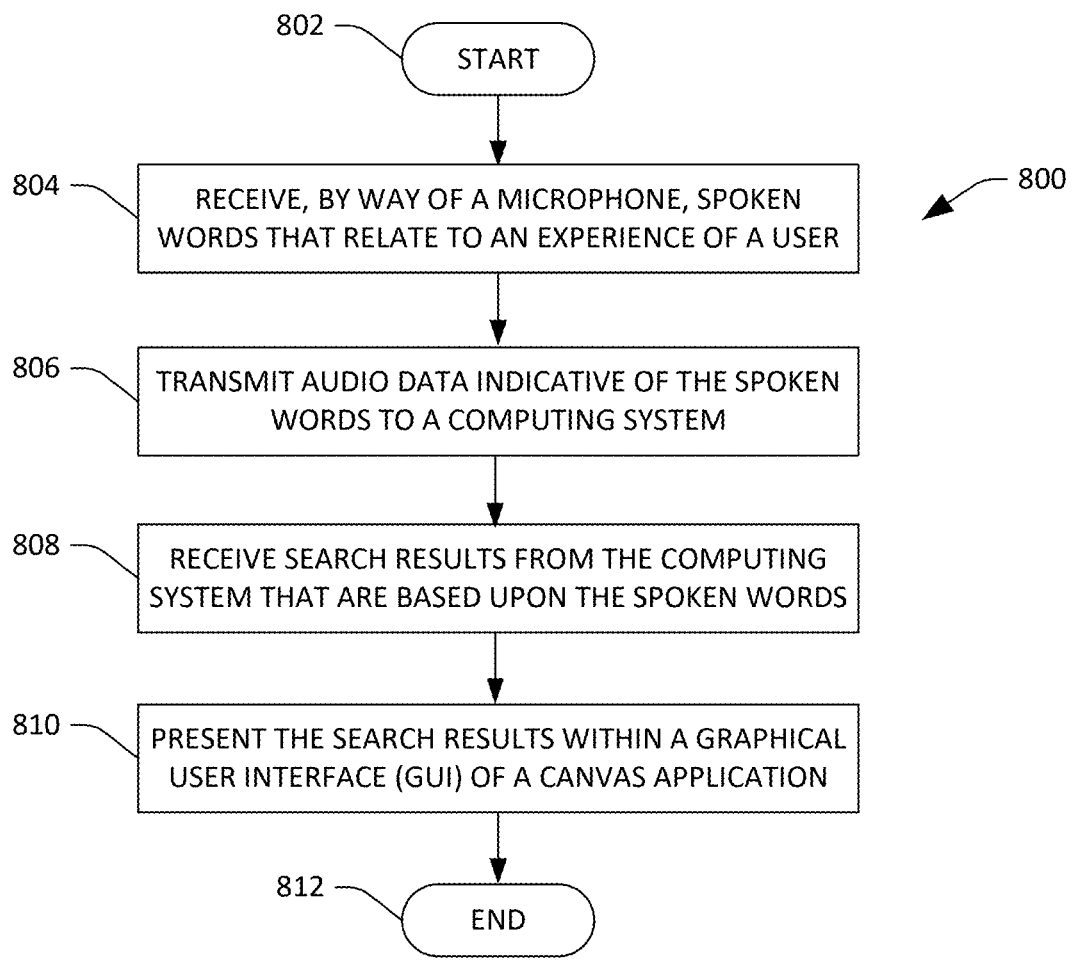
FIG. 8 is a flow diagram that illustrates an example methodology performed by a computing device operated by a user that facilitates proactive search.

FIGS. 7 and 8 illustrate example methodologies relating to proactive search. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an example methodology 700 performed by a computing system that facilitates proactive search is illustrated. The methodology 700 begins at 702, and at 704, upon obtaining computer-readable text that is indicative of spoken words uttered between a first user and a second user during a conversation occurring over a network connection via a real-time meeting application, the computing system determines a search intent based upon the text and a context of the first user. The context of the first user is determined based upon activity history of the first user in a plurality of computer-executable applications. At 706, upon determining the search intent, the computing system identifies a potential keyword in the computer-readable text using a natural language processing (NLP) algorithm. At 708, the computing system maps the potential keyword to a search domain in a plurality of search domains. At 710, upon mapping the potential keyword to the search domain, the computing system computes a confidence score for the potential keyword based upon the search domain, the context of the first user, and prior search queries of the first user. At 712, the computing system identifies the potential keyword as a keyword for search based upon the confidence score. At 714, the computing system executes a search over an index based upon the keyword. The index indexes user content of the first user and content of an organization to which the first user belongs. At 716, the computing system presents search results for the search on a display to the first user during the conversation. The methodology 700 concludes at 718.

Turning now to FIG. 8, an example methodology 800 performed by a computing device operated by a user that facilitates proactive search is illustrated. The methodology 800 begins at 802, and at 804, the computing device receives, by way of a microphone, spoken words that relate to an experience of the user. In an example, the user utters the spoken words to a second user. In another example, the second user utters the spoken words to the user. At 806, the computing device transmits audio data that is indicative of the spoken words to a computing system. The computing system converts the audio data into computer-readable text, determines a search intent based upon the text and a context of the user, identifies potential keywords in the text, maps the potential keywords to a search domain in a plurality of search domains, computes a confidence score for each of the potential keywords based upon the search domain, the context of the user, and prior search queries of the user, identifies keywords from amongst the potential keywords based upon the confidence score computed for each of the potential keywords, and executes a search over an index based upon the keywords. The index indexes user content of the user and content of an enterprise to which the user belongs. At 808, the computing device receives search results for the search from the computing system, where the search results are based upon the spoken words. At 810, the computing device presents the search results within a GUI of a canvas application presented on a display of the computing device. The methodology 800 concludes at 812.

Figure 9:
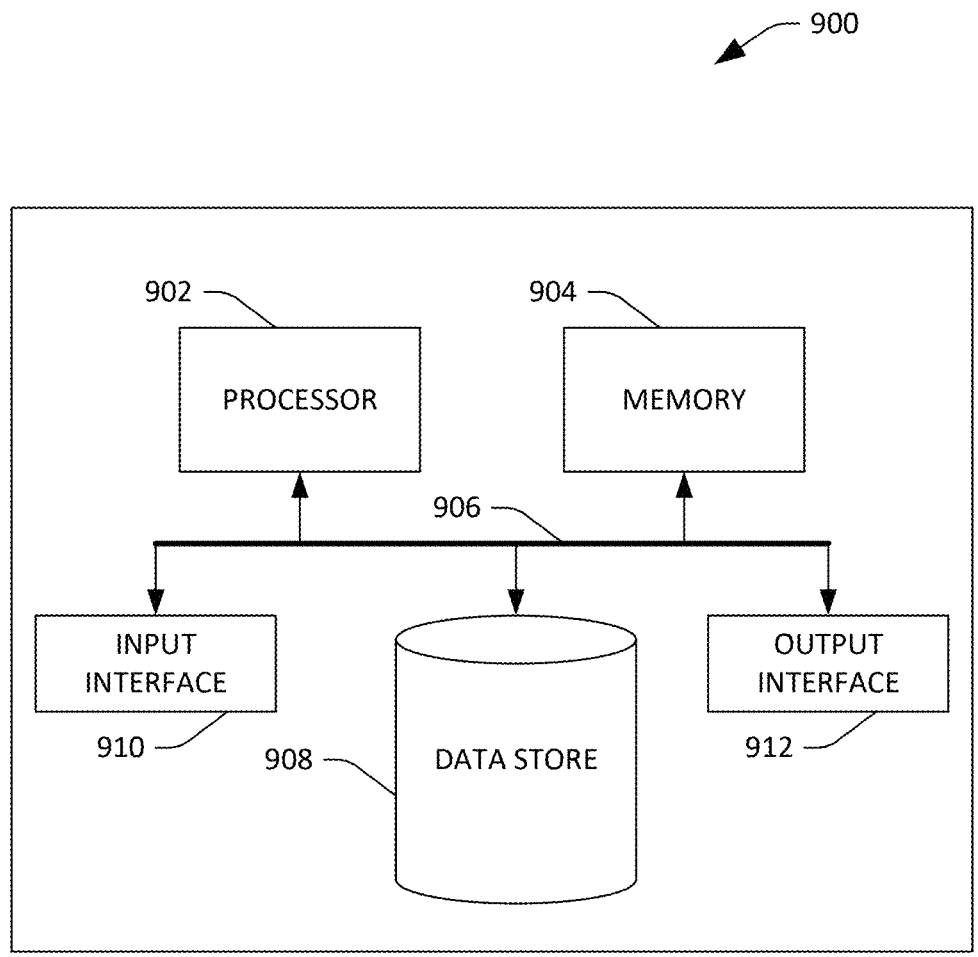
FIG. 9 is an example computing device.

Referring now to FIG. 9, a high-level illustration of an example computing device 900 that can be used in accordance with the systems and methodologies disclosed herein is illustrated. For instance, the computing device 900 may be used in a system that performs a proactive search based upon spoken words of a user. By way of another example, the computing device 900 can be used in a system that generates an index of content that is searched during a proactive search. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store content (e.g., documents, emails, etc.), user search queries, indices, dictionaries, search domains, etc.

The computing device 900 additionally includes a data store 908 that is accessible by the processor 902 by way of the system bus 906. The data store 908 may include executable instructions, content (e.g., documents, emails, etc.), user search queries, indices, dictionaries, search domains, etc. The computing device 900 also includes an input interface 910 that allows external devices to communicate with the computing device 900. For instance, the input interface 2010 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

The present disclosure relates to proactive contextual and personalized search query identification according to at least the following examples provided in the section below:

(A1) In one aspect, some embodiments include a method (e.g., 700) executed by a processor (e.g. 104) of a computing system (e.g., 102). The method includes upon obtaining computer-readable text that is indicative of spoken words (e.g. 118, 122) uttered between a first user (e.g., 120) and a second user (e.g., 124) during a conversation occurring over a network (e.g., 156) connection via a real-time meeting application, determining (e.g., 704) a search intent based upon the computer-readable text and a context of the first user. The context of the first user is determined based upon activity history of the first user in a plurality of computer-executable applications. The method further includes upon determining the search intent, identifying (e.g., 706) a potential keyword (e.g., 302) in the computer-readable text using a natural language processing (NLP) algorithm. The method additionally includes mapping (e.g., 708) the potential keyword to a search domain in a plurality of search domains (e.g., 148). The method also includes upon mapping the potential keyword to the search domain, computing (e.g., 710) a confidence score for the potential keyword based upon the search domain, the context of the first user, and prior search queries (e.g., 144) of the first user. The method further includes identifying (e.g., 712) the potential keyword as a keyword (e.g., 308) for search based upon the confidence score. The method additionally includes executing (e.g., 714) a search over an index (e.g., 132) based upon the keyword. The index indexes user content (e.g., 136) of the first user and content of an enterprise (e.g., 138) to which the first user belongs. The method also includes presenting (e.g., 716) search results for the search on a display (e.g., 170) to the first user during the conversation.

(A2) In some embodiments of the method of A1, the context of the first user is additionally determined based upon a role of the first user in the enterprise.

(A3) In some embodiments of any of the methods of A1-A2, the method further includes prior to obtaining the computer-readable text, obtaining the prior search queries of the first user. The method additionally includes generating a dictionary (e.g., 142) based upon the prior search queries, where the dictionary includes previous keywords used by the first user in the prior search queries and where the confidence score for the potential keyword is computed based upon the previous keywords in the dictionary.

(A4) In some embodiments of any of the methods of A1-A3, the search domain includes a plurality of related terms and mapping the potential keyword to the search domain includes matching the potential keyword to one or more related terms in the plurality of related terms.

(A5) In some embodiments of any of the methods of A1-A4, the spoken words include first spoken words uttered by the second user to the first user during the conversation.

(A6) In some embodiments of any of the methods of A1-A5, the search results for the search are presented within a graphical user interface (GUI) (e.g., 172) of the real-time meeting application.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A6).

(C1) In yet another aspect, some embodiments include a non-transitory computer-readable storage medium that includes instructions that, when executed by a processor (e.g., 104), cause the processor to perform any of the methods described herein (e.g., any of A1-A6).

(D1) In another aspect, some embodiments include a method executed by a computing system (e.g., 102) that includes a processor (e.g., 104) and memory (e.g., 106). The method includes obtaining computer-readable text that is indicative of spoken words (e.g., 118, 122) uttered between a first user (e.g., 120) and a second user (e.g., 124) during a conversation occurring over a network (e.g., 156) connection via a real-time meeting application. The method further includes upon obtaining the computer-readable text, determining a search intent based upon the computer-readable text and a context of the first user. The context of the first user is determined based upon activity history of the first user in a plurality of computer-executable applications. The method additionally includes upon determining the search intent, identifying a potential keyword (e.g., 302) in the computer-readable text using a natural language processing (NLP) algorithm. The method also includes identifying a search domain from amongst a plurality of search domains (e.g., 148) based upon the potential keyword. The method further includes upon identifying the search domain, computing a confidence score for the potential keyword based upon the search domain, the context of the first user, and prior search queries (e.g., 144) of the first user. The method additionally includes identifying the potential keyword as a keyword (e.g., 308) for search based upon the confidence score. The method also includes executing a search over an index (e.g., 132) based upon the keyword. The index indexes user content (e.g., 136) of the first user and content of an enterprise (e.g., 138) to which the first user belongs. The method further includes presenting search results for the search on a display (e.g., 170) to the first user during the conversation.

(D2) In some embodiments of the method of D1, the method further includes prior to obtaining the computer-readable text, obtaining audio data that is indicative of the spoken words. The method additionally includes performing automatic speech recognition (ASR) on the audio data, where the computer-readable text is obtained based upon results of the ASR.

(D3) In some embodiments of any of the methods of D1-D2, the method further includes accessing user permission settings of the first user. The method additionally includes presenting the search results for the search on a second display to the second user during the conversation based upon the user permission settings of the first user.

(D4) In some embodiments of any of the methods of D1-D3, the spoken words include first spoken words uttered by the first user to the second user during the conversation.

(D5) In some embodiments of any of the methods of D1-D4, identifying the potential keyword in the computer-readable text includes assigning part of speech tags to each word in the computer-readable text and the potential keyword is identified based upon the part of speech tags.

(D6) In some embodiments of any of the methods of D1-D5, the context of the first user includes an identifier for a topic that is of interest to the first user.

(D7) In some embodiments of any of the methods of D1-D6, the activity history of the first user includes activities performed by the first user in the plurality of computer-executable applications during a predefined period of time.

(D8) In some embodiments of any of the methods of D1-D7, the potential keyword includes a first potential keyword and a second potential keyword and a first confidence score is computed for the first potential keyword and a second confidence score is computed for the second potential keyword and the first potential keyword is identified as the keyword for search based upon the first confidence score being greater than the second confidence score.

(D9) In some embodiments of any of the methods of D1-D8, presenting the search results for the search on the display to the first user during the conversation includes identifying a storage location of a document based upon the search results, generating a link (e.g., 408) to the document based upon the storage location, and displaying the link on the display, where the document is presented on the display upon the link being selected.

(D10) In some embodiments of any of the methods of D1-D9, the plurality of computer-executable applications include one or more of an email application, a real-time messaging application, a web browser, or a file navigation application.

(D11) In some embodiments of any of the methods of D1-D10, the method further includes prior to obtaining the computer-readable text, generating the index based upon activity history of a plurality of users in the plurality of computer-executable applications, where the plurality of users include the first user and the second user.

(E1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of D1-D11).

(F1) In yet another aspect, some embodiments include a non-transitory computer-readable storage medium that includes instructions that, when executed by a processor (e.g., 104), cause the processor to perform any of the methods described herein (e.g., any of D1-D11).

(G1) In another aspect, some embodiments include a method performed by a computing system (e.g., 102) that includes a processor (e.g., 104). The method includes obtaining audio data that is indicative of spoken words (e.g., 118, 122) uttered between a first user (e.g., 120) and a second user (e.g., 124) during a conversation occurring over a network (e.g., 156) connection via a real-time meeting application. The method further includes performing automatic speech recognition (ASR) in real-time on the audio data. The method additionally includes obtaining computer-readable text based upon results of the ASR. The method also includes upon obtaining the computer-readable text, determining a search intent based upon the computer-readable text and a context of the first user, where the context of the first user is determined based upon activity history of the first user in a plurality of computer-executable applications. The method further includes upon determining the search intent, identifying a potential keyword (e.g., 302) in the computer-readable text using a natural language processing (NLP) algorithm. The method additionally includes identifying a search domain in a plurality of search domains (e.g., 148) based upon the potential keyword. The method also includes computing a confidence score for the potential keyword based upon the search domain, the context of the first user, and prior search queries (e.g., 144) of the first user. The method further includes identifying the potential keyword as a keyword (e.g., 308) for search based upon the confidence score. The method additionally includes causing a search to be executed over an index (e.g., 132) based upon the keyword, where the index indexes user content (e.g., 136) of the first user and content of an enterprise (e.g., 138) to which the first user belongs. The method also includes presenting search results for the search on a display (e.g., 170) to the first user during the conversation.

(G2) In some embodiments of the method of G1, the search results include identifiers for documents that the first user has not previously accessed.

(G3) In some embodiments of any of the methods of G1-G2, causing the search to be executed over the index includes sending the keyword to a search application programming interface (API) (e.g., 152), where the search API searches the index based upon the keyword. Causing the search to be executed over the index also includes receiving the search results for the search from the search API.

(H1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of G1-G3).

(I1) In yet another aspect, some embodiments include a non-transitory computer-readable storage medium that includes instructions that, when executed by a processor (e.g., 104), cause the processor to perform any of the methods described herein (e.g., any of G1-G3).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
  a processor; and
  memory storing instructions that, when executed by the processor, cause the processor to perform acts comprising:
    obtaining computer-readable text that is indicative of spoken words uttered between a first user and a second user during a conversation occurring over a network connection via a real-time meeting application;
    upon obtaining the computer-readable text, providing the computer-readable text and a context of the first user as input into an intent identification module, wherein the intent identification module generates an output indicative of an intent, wherein the context of the first user is determined based upon activity history of the first user in a plurality of computer-executable applications;
    upon obtaining an output of the intent identification module indicative of a search intent, identifying a potential keyword in the computer-readable text using a natural language processing (NLP) algorithm;
    identifying a search domain from amongst a plurality of search domains based upon the potential keyword;
    upon identifying the search domain, computing a confidence score for the potential keyword based upon the search domain, the context of the first user, and prior search queries of the first user;
    identifying the potential keyword as a keyword for search based upon the confidence score;
    executing a search over an index based upon the keyword, wherein the index indexes user content of the first user and content of an enterprise to which the first user belongs; and
    presenting search results for the search on a display to the first user during the conversation.

2. The computing system of claim 1, the acts further comprising:
  prior to obtaining the computer-readable text, obtaining audio data that is indicative of the spoken words; and
  performing automatic speech recognition (ASR) on the audio data, wherein the computer-readable text is obtained based upon results of the ASR.

3. The computing system of claim 1, the acts further comprising:
  accessing user permission settings of the first user;
  presenting the search results for the search on a second display to the second user during the conversation based upon the user permission settings of the first user.

4. The computing system of claim 1, wherein the spoken words comprise first spoken words uttered by the first user to the second user during the conversation.

5. The computing system of claim 1, wherein identifying the potential keyword in the computer-readable text comprises assigning part of speech tags to each word in the computer-readable text, wherein the potential keyword is identified based upon the part of speech tags.

6. The computing system of claim 1, wherein the context of the first user comprises an identifier for a topic that is of interest to the first user.

7. The computing system of claim 1, wherein the activity history of the first user comprises activities performed by the first user in the plurality of computer-executable applications during a predefined period of time.

8. The computing system of claim 1, wherein the potential keyword comprises a first potential keyword and a second potential keyword, wherein a first confidence score is computed for the first potential keyword and a second confidence score is computed for the second potential keyword, wherein the first potential keyword is identified as the keyword for search based upon the first confidence score being greater than the second confidence score.

9. The computing system of claim 1, wherein presenting the search results for the search on the display to the first user during the conversation comprises:
  identifying a storage location of a document based upon the search results;
  generating a link to the document based upon the storage location; and
  displaying the link on the display, wherein the document is presented on the display upon the link being selected.

10. The computing system of claim 1, wherein the plurality of computer-executable applications include one or more of:
  an email application;
  a real-time messaging application;
  a web browser; or
  a file navigation application.

11. The computing system of claim 1, the acts further comprising:
  prior to obtaining the computer-readable text, generating the index based upon activity history of a plurality of users in the plurality of computer-executable applications, wherein the plurality of users include the first user and the second user.

12. A method executed by a processor of a computing system, the method comprising:
  upon obtaining computer-readable text that is indicative of spoken words uttered between a first user and a second user during a conversation occurring over a network connection via a real-time meeting application, providing the computer-readable text and a context of the first user as input into an intent identification module, wherein the intent identification module generates an output indicative of an intent, wherein the context of the first user is determined based upon activity history of the first user in a plurality of computer-executable applications;

upon obtaining an output of the intent identification module indicative of a search intent, identifying a potential keyword in the computer-readable text using a natural language processing (NLP) algorithm;

mapping the potential keyword to a search domain in a plurality of search domains;

upon mapping the potential keyword to the search domain, computing a confidence score for the potential keyword based upon the search domain, the context of the first user, and prior search queries of the first user;

identifying the potential keyword as a keyword for search based upon the confidence score;

executing a search over an index based upon the keyword, wherein the index indexes user content of the first user and content of an enterprise to which the first user belongs; and presenting search results for the search on a display to the first user during the conversation.

13. The method of claim 12, wherein the context of the first user is additionally determined based upon a role of the first user in the enterprise.

14. The method of claim 12, further comprising:

prior to obtaining the computer-readable text, obtaining the prior search queries of the first user; and generating a dictionary based upon the prior search queries, wherein the dictionary comprises previous keywords used by the first user in the prior search queries, wherein the confidence score for the potential keyword is computed based upon the previous keywords in the dictionary.

15. The method of claim 12, wherein the search domain comprises a plurality of related terms, wherein mapping the potential keyword to the search domain comprises matching the potential keyword to one or more related terms in the plurality of related terms.

16. The method of claim 12, where the spoken words comprise first spoken words uttered by the second user to the first user during the conversation.

17. The method of claim 12, wherein the search results for the search are presented within a graphical user interface (GUI) of the real-time meeting application.

18. A non-transitory computer-readable storage medium comprising instructions that, when executed by a processor, cause the processor to perform acts comprising:

obtaining audio data that is indicative of spoken words uttered between a first user and a second user during a conversation occurring over a network connection via a real-time meeting application;

performing automatic speech recognition (ASR) in real-time on the audio data;

obtaining computer-readable text based upon results of the ASR;

upon obtaining the computer-readable text, providing the computer-readable text and a context of the first user as input into an intent identification module, wherein the intent identification module generates an output indicative of an intent, wherein the context of the first user is determined based upon activity history of the first user in a plurality of computer-executable applications;

upon obtaining an output of the intent identification module indicative of a search intent, identifying a potential keyword in the computer-readable text using a natural language processing (NLP) algorithm;

identifying a search domain in a plurality of search domains based upon the potential keyword;

computing a confidence score for the potential keyword based upon the search domain, the context of the first user, and prior search queries of the first user;

identifying the potential keyword as a keyword for search based upon the confidence score;

causing a search to be executed over an index based upon the keyword, wherein the index indexes user content of the first user and content of an enterprise to which the first user belongs; and presenting search results for the search on a display to the first user during the conversation.

19. The non-transitory computer-readable storage medium of claim 18, wherein the search results include identifiers for documents that the first user has not previously accessed.

20. The non-transitory computer-readable storage medium of claim 18, wherein causing the search to be executed over the index comprises:

sending the keyword to a search application programming interface (API), wherein the search API searches the index based upon the keyword; and receiving the search results for the search from the search API.

* * * * *